Figure 1:
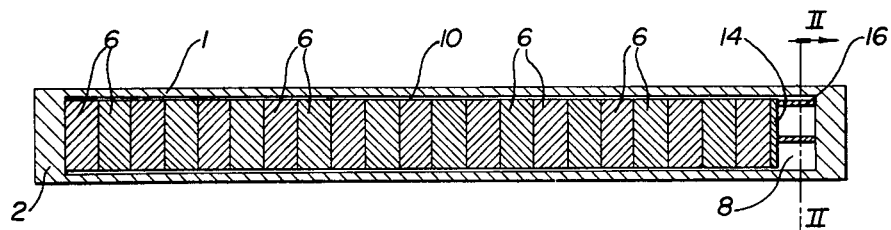

United States Patent [19]

Meadowcraft et al.

[11] 4,036,691
[45] July 19, 1977

[54] NUCLEAR FUEL ELEMENT

[75] Inventors: Ronald Ross Meadowcroft; Alastair Stewart Bain, both of Deep River, Canada

[73] Assignee: Atomic Energy of Canada Limited, Ottawa, Canada

[21] Appl. No.: 662,857

[22] Filed: Mar. 1, 1976

[30] Foreign Application Priority Data

Dec. 3, 1975 Canada .................... 240961/75

[51] Int. Cl.² ............................................. G21C 3/04
[52] U.S. Cl. ..................................... 176/68; 176/74; 176/79
[58] Field of Search .................. 176/68, 73, 74, 79

[56] References Cited

U.S. PATENT DOCUMENTS

| | | | |
|---|---|---|---|
| 3,647,623 | 3/1972 | Hepps et al. | 176/68 |
| 3,669,833 | 6/1972 | De Boeck et al. | 176/73 X |
| 3,671,393 | 6/1972 | Williams | 176/68 X |
| 3,679,545 | 7/1972 | Leirvik | 176/68 |
| 3,898,125 | 8/1975 | Grossman et al. | 176/68 |

FOREIGN PATENT DOCUMENTS 1,816,543  7/1970  Germany .................... 176/68

*Primary Examiner*—Peter A. Nelson
*Attorney, Agent, or Firm*—Francis W. Lemon

[57] ABSTRACT

A nuclear fuel element wherein a tubular cladding of zirconium or a zirconium alloy has a fission gas plenum chamber which is held against collapse by the loops of a spacer in the form of a tube which has been deformed inwardly at three equally spaced, circumferential positions to provide three loops. A heat resistant disc of, say, graphite separates nuclear fuel pellets within the cladding from the plenum chamber. The spacer is of zirconium or a zirconium alloy.

1 Claim, 2 Drawing Figures

U.S. Patent    July 19, 1977    4,036,691

NUCLEAR FUEL ELEMENT

This invention relates to nuclear fuel elements.

It has already been proposed in U.S. Pat. No. 3,627,635 (Smith et al) to provide a fission gas plenum chamber in one end of fuel elements comprising a tubular cladding containing nuclear fuel pellets and sealed by end closures. A resilient cup-shaped retainer or plenum chamber insert of zirconium is provided in the tubular cladding at the end of the fuel pellets, and in frictional engagement with the tubular cladding, to retain the fuel in the desired position within the tubular cladding and to prevent displacement of the fuel into the fission gas plenum chamber. The resilient cup-shaped retainer is spaced from the end of the fuel cladding so that the cup-shaped retainer can be displaced along the fuel cladding to accommodate linear expansion of the nuclear fuel. The purpose of the fission gas plenum chamber is to prevent gaseous fission products, released from the nuclear fuel during burn up, from generating an excessive internal pressure in the tubular cladding.

In natural uranium ($UO_2$) fuelled, heavy water moderated nuclear reactors, the tubular cladding is made so thin, in order to reduce the neutron capture cross-section, that an external, cooling fluid pressure which collapses the tubular cladding on to the nuclear fuel pellets and plenum spacer is tolerable, while an internal pressure expanding the tubular cladding outwardly in the unsupported direction is intolerable. Should the internal pressure become of sufficient magnitude to rupture the tubular cladding then the coolant flowing along the fuel channel will become contaminated.

The Smith et al resilient cup-shaped retainer or plenum chamber insert does not support the plenum chamber length of the tubular cladding against collapse by the external pressure of the coolant. Further, the cup-shaped retainer is expensive to produce.

It is an object of the present invention to provide a nuclear fuel element having a plenum insert which is inexpensive to produce and which supports the plenum chamber length of the tubular cladding against collapse by the external pressure of the coolant.

According to the present invention there is provided a nuclear fuel element, comprising:

a. a tubular cladding of a material selected from the group consisting of zirconium and zirconium alloys, b. end closures sealing the ends of the tubular cladding, the end closures being of a material selected from the group consisting of zirconium and zirconium alloys, c. a plurality of cylindrical, nuclear fuel pellets in the tubular cladding and extending therealong, in end-to-end relation, to a fission gas plenum chamber in the tubular cladding and adjacent an end closure, the fuel pellets loosely fitting in the tubular cladding in a radial direction, d. a heat resistant disc separating the cylindrical, nuclear fuel pellets from the plenum chamber and loosely fitting in the tubular cladding in a radial direction, and e. a spacer in the plenum chamber and supporting the disc from falling into the plenum chamber, the spacer being of the shape of a tube, which has been deformed inwardly towards a radially central portion of the tubular cladding at a plurality of circumferentially spaced positions to provide a plurality of circumferentially spaced looped portions looping substantially radially outwardly from the radially central portion of the tubular cladding the looped portions being substantially orthogonal to the tubular cladding to positions adjacent the tubular cladding, and the spacer being of a material selected from the group consisting of zirconium and zirconium alloys.

Figure 2:
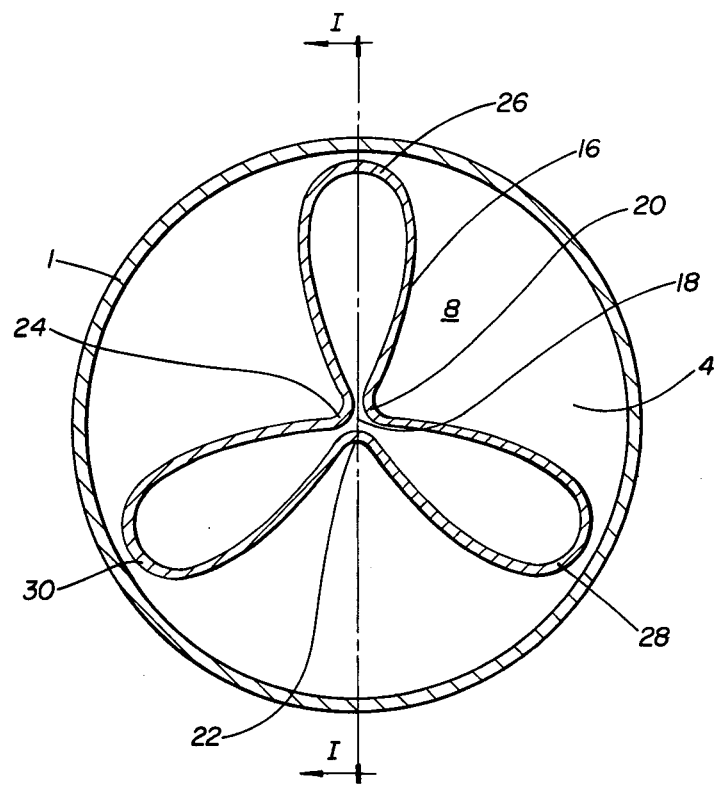

In the accompanying drawings which illustrate, by way of example, an embodiment of the present invention, FIG. 1 is a sectional side view along I—I, FIG. 2 of a nuclear fuel element, and FIG. 2 is an enlarged, sectional end view along II—II, FIG. 1.

Referring to the drawings, there is shown a nuclear fuel element, comprising:

a. a tubular cladding 1 of a material selected from the group consisting of zirconium and zirconium alloys, b. end closures 2 and 4 sealing the ends of the tubular cladding 1, the end closures 2 and 4 being of a material selected from the group consisting of zirconium and zirconium alloys, c. a plurality of cylindrical, nuclear fuel pellets 6 in the tubular cladding 1 and extending therealong in end-to-end relation, to a fission gas plenum chamber 8 in the tubular cladding 1 and adjacent end closure 4, the fuel pellets 6 loosely fitting in the tubular cladding 1 in a radial direction, by means of an annular clearance 10, d. a heat resistant disc 14 separating the cylindrical, nuclear fuel pellets 6 from the plenum chamber 8 and loosely fitting in the tubular cladding 1 in a radial direction by the annular clearance 10, and e. a spacer 16 in the plenum chamber 8 and supporting the disc 14 from falling into the plenum chamber 8, the spacer 16 being of the shape of a tube, which has been deformed inwardly towards a radially central portion 18 (FIG. 2) of the tubular cladding 1 at a plurality of circumferentially spaced positions 20, 22 and 24 to provide a plurality of, in this embodiment three, circumferentially spaced looped portions 26, 28 and 30 looping substantially radially outwardly from the radially central portion 18 of the tubular cladding 1, the looped portions 26, 28 and 30 being substantially orthogonal to the tubular cladding 1, and the spacer 16 being of a material selected from the group consisting of zirconium and zirconium alloys.

The tubular cladding 1 is a seamless tube and is preferably of a zirconium alloy comprising, by weight 1.20% to 1.70% tin, 0.18% to 0.24% iron, 0.07% to 0.13% chromium, total iron + chromium + nickel between 0.28% and 0.37%, oxygen content between 1000 and 1400 ppm, balance zirconium except for impurities.

The end closures 2 and 4 may be conventional end caps which are partially inserted into the ends of the tubular cladding 1 and then sealed to the tubular cladding 1 by a circumferential weld. The end closures 2 and 4 are preferably of the same zirconium alloy as the tubular cladding 1.

In this embodiment the fuel pellets 6 are of uranium dioxide of natural enrichment (0.71 wt% U-235 in total U), and the overall length of the fuel element is less than 2 feet so that linear expansion of the fuel pellets 6 is of little importance. The annular clearance 10 provides a gas path from the fuel pellets 6 to the plenum chamber 8.

The heat resistant disc 14 is preferably a graphite disc, however, discs of, for example, molybdenum or graphite coated zirconium or graphite coated zirconium alloys or any other material that is heat resistant to the high $UO_2$ temperatures.

The spacer 16 is also preferably of the same zirconium alloy as the tubular cladding 1, and has been satisfactorily made, and then stress relieved, by cold working tubing of this zirconium alloy and having a 0.42 mm wall thickness. A tube may be deformed inwardly at the positions 20, 22 and 24, to produce the looped portons 26, 28 and 30, by drawing the tubing between deforming rolls or through a die.

In operation, any undue pressure build up in the tubular cladding from gaseous fission products generated and released from the fuel pellets 6 during burnup is avoided by these gaseous fission products increasing the pressure in the plenum chamber 8 in addition to increasing the pressure in the annular clearance 10.

The spacer 16 was found to be of low unit cost in production and provided adequate support for the disc 14 with the desirable feature that the spacer 16 supported the disc 14 from more or less the outer edge of the disc 14 to its center, rather than only around a particular annulus in the manner of known spacers, and so a thinner disc 14 could be used than was previously possible. It will readily be seen that the looped portions 26, 28 and 30 prevent any undue collapse of the tubular cladding 1 by external coolant pressure.

In other embodiments the spacer 16 may be formed with more than three looped portions 26, 28 and 30, although the three looped portions 26, 28 and 30 have been found to adequately support the disc 14 with the minimum amount of material for the spacer 16.

The loops 26, 28 and 30 may be other shapes than the shape shown in FIG. 2, for example the outer portions of the loops 26, 28 and 30 may be curved to be parallel with the wall of the tubular cladding 1. Further, it is not essential for the spacer 16 to be form with loops in a symmetrical pattern.

Typical dimensions of a nuclear fuel element of the type shown in FIG. 1 are, Overall length of the nuclear fuel element: 500 mm Outside diameter of the tubular cladding 1: 13 - 20 mm Wall thickness of the tubular cladding 1: 0.4 mm Diametral clearance between the spacer 16 and the tubular cladding 1: 0.076 - 0.15 mm.

We claim:
1. A nuclear fuel element, comprising:
   a. a tubular cladding of a material selected from the group consisting of zirconium and zirconium alloys,
   b. end closures sealing the ends of the tubular cladding, the end closures being of a material selected from the group consisting of zirconium and zirconium alloys,
   c. a plurality of cylindrical, nuclear fuel pellets in the tubular cladding and extending therealong, in end-to-end relation, to a fission gas plenum chamber in the tubular cladding and adjacent an end closure, the fuel pellets loosely fitting in the tubular cladding in a radial direction,
   d. a heat resistant disc separating the cylindrical, nuclear fuel pellets from the plenum chamber and loosely fitting in the tubular cladding in a radial direction, and
   e. a spacer in the plenum chamber and supporting the disc from falling into the plenum chamber, the spacer being of the shape of a tube, which has been deformed inwardly towards a radially central portion of the tubular cladding at a plurality of circumferentially spaced positions to provide a plurality of circumferentially spaced looped portions looping substantially radially outwardly from the radially central portion of the tubular cladding to positions adjacent the tubular cladding, the looped portions being substantially orthogonal to the tubular cladding, and the spacer being of a material selected from the group consisting of zirconium and zirconium alloys.

* * * * *